US008570958B2

(12) United States Patent
Mohanty et al.

(10) Patent No.: US 8,570,958 B2
(45) Date of Patent: Oct. 29, 2013

(54) METHOD AND APPARATUS FOR EFFICIENT SCHEDULING IN BROADBAND WIRELESS ACCESS NETWORKS

(75) Inventors: Shantidev Mohanty, Santa Clara, CA (US); Rath Vannithamby, Portland, OR (US); Kamran Etemad, Potomac, MD (US); Roshni M. Srinivasan, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 771 days.

(21) Appl. No.: 12/419,250

(22) Filed: Apr. 6, 2009

(65) Prior Publication Data
US 2009/0257389 A1 Oct. 15, 2009

Related U.S. Application Data

(60) Provisional application No. 61/042,632, filed on Apr. 4, 2008.

(51) Int. Cl.
*H04W 4/00* (2009.01)

(52) U.S. Cl.
USPC .......................................................... 370/329

(58) Field of Classification Search
USPC ......... 370/203, 204–215, 229–240, 241–253, 370/310–337, 338–350, 395.1, 395.3, 370/395.4, 395.41, 395.42, 395.5, 395.52, 370/395.53, 412–421, 431–457, 458–463, 370/464–497, 498–529
See application file for complete search history.

(56) References Cited

U.S. PATENT DOCUMENTS

| | | | |
|---|---|---|---|
| 2008/0049667 A1* | 2/2008 | Rong et al. | 370/329 |
| 2008/0232284 A1* | 9/2008 | Dalsgaard et al. | 370/310 |
| 2009/0070650 A1* | 3/2009 | Bourlas et al. | 714/748 |
| 2009/0075667 A1* | 3/2009 | Bourlas | 455/452.1 |
| 2011/0002293 A1* | 1/2011 | Yuk et al. | 370/329 |
| 2011/0182245 A1* | 7/2011 | Malkamaki et al. | 370/329 |
| 2011/0206020 A1* | 8/2011 | Hollick et al. | 370/337 |

* cited by examiner

*Primary Examiner* — Jung-Jen Liu
(74) *Attorney, Agent, or Firm* — Schwegman, Lundberg & Woessner, P.A.

(57) ABSTRACT

The various inventive embodiments relate to arrangement of information elements (IEs) for persistent and/or dynamic allocations in a wireless broadband network and include optimization techniques to eliminate the repetitive information fields from the downlink (DL)-Persistent-IEs, uplink (UL)-Persistent-IEs, DL-IEs, and UL-IEs. Elimination of repetitive information fields reduces MAP overhead. In addition embodiments relate to methods to use the same hybrid automatic repeat request (HARQ) region to contain persistent as well as non-persistent allocations. The use of the same HARQ region for persistent as well as non-persistent allocations further reduces the MAP overhead as it requires a single header to define the HARQ region instead of the two headers that are required to define two different HARQ regions: one for persistent allocation and the second one for non-persistent allocations.

6 Claims, 9 Drawing Sheets

| PARAMETERS | PERSISTENT ALLOCATION | | | NON-PERSISTENT ALLOCATION |
| --- | --- | --- | --- | --- |
| | DE-ALLOCATION | ALLOCATION | REALLOCATION | |
| SCENARIO SPECIFIC PARAMETERS | PERSISTENT FLAG (1 BIT=1) ALLOCATION FLAG (1 BIT=0) OFFSET (10 BITS) DURATION (10 BITS) | PERSISTENT FLAG (1 BIT=1) ALLOCATION FLAG (1 BIT=1) ALLOCATION PERIODICITY INDICATION FLAG (1 BIT) IF (ALLOCATION PERIODICITY INDICATION FLAG=1) {ALLOCATION PERIODICITY (4 BITS)} NUMBER OF ACIDs (N_ACID) (4 BITS) | PERSISTENT FLAG (1 BIT=1) ALLOCATION FLAG (1 BIT=1) ALLOCATION PERIODICITY INDICATION FLAG (1 BIT) IF (ALLOCATION PERIODICITY INDICATION FLAG=1){ ALLOCATION PERIODICITY (4 BITS)} NUMBER OF ACIDs (N_ACID) (4 BITS) | PERSISTENT FLAG (1 BIT=0) |
| COMMON PARAMETERS (EXCEPT DE-ALLOCATION) | | OFFSET INDICATION FLAG (1 BIT) DURATION INDICATION FLAG (1 BIT) MCS INDICATION FLAG (1 BIT) IF (OFFSET INDICATION FLAG=1){ OFFSET (10 BITS) } IF (DURATION INDICATION FLAG=1){ DURATION (10 BITS) } IF (MCS INDICATION FLAG=1){ DIUC (4 BITS) REPETITION CODING (2 BITS) } RCID (3/7/11/16 BITS) ACID (4 BITS) AI_SN (1 BIT) ACK DISABLE (1 BIT) DEDICATED CONTROL INDICATOR (2 BITS) | | |

FORMAT OF SUB-BURST IEs IN DIFFERENT SCENARIOS

*FIG. 5*

PERSISTENT IE SIZE (IN BITS)

| (AF, OF, DF, MF) | DE-ALLOCATION | ALLOCATION | RE-ALLOCATION |
|---|---|---|---|
| 0000 | 22 | 29 | 29 | ← MIN
| 0001 | 22 | 35 | 35 |
| 0010 | 22 | 39 | 39 |
| 0011 | 22 | 45 | 45 |
| 0100 | 22 | 39 | 39 |
| 0101 | 22 | 45 | 45 |
| 0110 | 22 | 49 | 49 |
| 0111 | 22 | 55 | 55 |
| 1000 | 22 | 33 | 33 |
| 1001 | 22 | 39 | 39 |
| 1010 | 22 | 43 | 43 |
| 1011 | 22 | 49 | 49 |
| 1100 | 22 | 43 | 43 |
| 1101 | 22 | 49 | 49 |
| 1110 | 22 | 53 | 53 |
| 1111 | 22 | 59 | 59 | ← MAX

AF: ALLOCATION PERIODICITY INDICATOR FLAG
OF: OFFSET INDICATOR FLAG
DF: DURATION INDICATOR FLAG
MF: MCS INDICATOR FLAG
RCID 11 IS ASSUMED

*FIG. 7*

NON-PERSISTENT (DYNAMIC ALLOCATION) IE SIZE

| (OF, DF, MF) | DYNAMIC ALLOCATION IE SIZE (IN BITS) |
|---|---|
| 000 | 20 — MIN |
| 001 | 26 |
| 010 | 30 |
| 011 | 36 |
| 100 | 30 |
| 101 | 36 |
| 110 | 40 |
| 111 | 46 — MAX |

OF: OFFSET INDICATOR FLAG
DF: DURATION INDICATOR FLAG
MF: MCS INDICATOR FLAG
RCID 11 IS ASSUMED

*FIG. 8*

METHOD AND APPARATUS FOR EFFICIENT SCHEDULING IN BROADBAND WIRELESS ACCESS NETWORKS

CROSS-REFERENCE TO RELATED APPLICATIONS

The present application claims the benefit of U.S. provisional application Ser. No. 61/042,632, filed Apr. 4, 2008, the entire content of which is incorporated by reference herein.

BACKGROUND OF THE INVENTION

It is becoming more important to be able to provide telecommunication services to subscribers which are relatively inexpensive as compared to cable and other land line technologies. Further, the increased use of mobile applications has resulted in much focus on developing wireless systems capable of delivering large amounts of data at high speed for mobile users.

Development of more efficient and higher bandwidth wireless networks has become increasingly important and addressing issues of how to maximize efficiencies of such networks is an ongoing. One such issue relates to efficient scheduling of transmissions between a base station and multiple user stations in a multiple access wireless network such as a network using orthogonal frequency division multiple access (OFDMA) protocols.

BRIEF SUMMARY OF THE DRAWINGS

FIG. 5 is an example format for information elements (IEs) in scheduling/mapping according to various embodiments;

FIG. 7 shows a size of persistent sub-burst information element (IE) for different optimization scenarios;

FIG. 8 shows a size of non-persistent sub-burst allocation IEs for different optimization scenarios.

DESCRIPTION OF THE INVENTION

While the following detailed description may describe example embodiments of the present invention in relation to broadband wireless metropolitan area networks (WMANs), the invention is not limited thereto and can be applied to other types of wireless networks where similar advantages may be obtained. Such networks specifically include, if applicable, wireless local area networks (WLANs), wireless personal area networks (WPANs) and/or wireless wide area networks (WWANs) such a cellular networks and the like. Further, while specific embodiments may be described in reference to wireless networks utilizing multi-user Orthogonal Frequency Division Multiplexing (OFDM) otherwise referred to as Orthogonal Frequency Division Multiple Access (OFDMA), the embodiments of present invention are not limited thereto and, for example, can be implemented using other air interfaces where suitably applicable.

The following inventive embodiments may be used in a variety of applications including transmitters and receivers of a radio system, although the present invention is not limited in this respect. Radio systems specifically included within the scope of the present invention include, but are not limited to, network interface cards (NICs), network adaptors, fixed or mobile access points, mesh stations, base stations, hybrid coordinators (HCs), gateways, bridges, hubs, routers or other network peripherals. Further, the radio systems within the scope of the invention may include cellular radiotelephone systems, satellite systems, personal communication systems (PCS), two-way radio systems and two-way pagers as well as computing devices including such radio systems such as personal computers (PCs) and related peripherals, personal digital assistants (PDAs), personal computing accessories, hand-held communication devices and all existing and future arising systems which may be related in nature and to which the principles of the inventive embodiments could be suitably applied.

Networks that may employ embodiments of the present invention may be a high throughput wireless communication network such as those contemplated by various IEEE 802.16 standards for fixed and/or mobile broadband wireless access (BWA), a $3^{rd}$ Generation Partnership Project (3GPP) Long Term Evolution (LTE) mobile phone network or other type of high bandwidth WMAN, WLAN or WWAN.

In the IEEE 802.16 standards (sometimes referred to as WiMAX, an acronym that stands for Worldwide Interoperability for Microwave Access), two principle communicating wireless network nodes are defined including the Base Station (BS) (e.g., base station 115) and the Subscriber Station (SS) (e.g., subscriber stations 120, 122, 124). However, these terms are used in a generic manner throughout this specification and their denotation in this respect is in no way intended to limit the inventive embodiments to any particular type of network.

Figure 1:
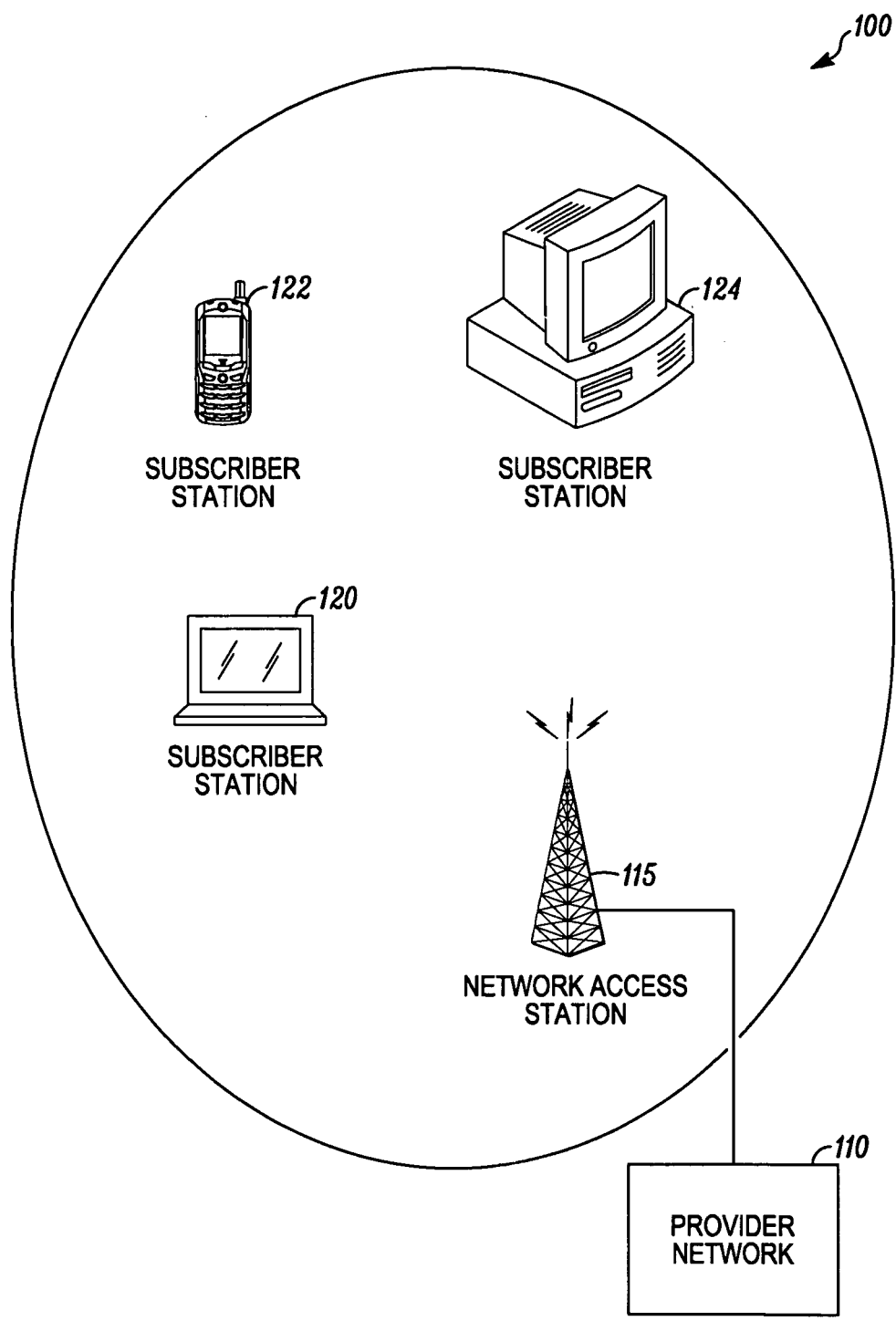
FIG. 1 is a block diagram illustrating a wireless broadband network according to various embodiments.

In the example configuration of FIG. 1, base station 115 is a managing entity which controls the wireless communications between subscriber stations 120-124 and provider network 110 and/or potentially between the subscriber stations themselves. Subscriber stations 120-124 in turn, may facilitate various service connections of other devices (not shown) to network 110 via a private or public local area network (LAN), although the embodiments are not limited in this respect.

In one implementation base station 115 may send data to subscriber stations 120-124 in downlink (DL) and receives data from stations 120-124 in uplink (UL) in a sequence of transmission time intervals (TTIs). A TTI in some network configurations such as IEEE 802.16 standards may be referred to as an air frame or a frame. In other network configurations, TTIs may be referred to as a packet. In one example embodiment, uplink and downlink communications are maintained by sending frames at constant, but configurable intervals (e.g. every 5 ms). OFDMA, also referred to as Multiuser-OFDM, is being considered as a modulation and multiple access method for fourth generation wireless networks. OFDMA is an extension of Orthogonal Frequency Division Multiplexing (OFDM), OFDM currently being the modulation of choice for many high speed data access systems such as IEEE 802.11a/g wireless LAN (WiFi) and IEEE 802.16a/d wireless broadband access systems (WiMAX).

OFDMA allows simultaneous transmission to multiple users. Since the probability that all users experience a deep fade in a particular subcarrier is very low, optimization of subcarrier or subchannel assignment can assure that subcarriers are assigned to the users that see good channel gains on them.

In OFDMA, each single radio frame or TTI may therefore consist of a plurality of active (i.e., available for carrying data) subcarriers which may be partitioned into subsets of adjacent or non-adjacent subcarriers called subchannels where each subchannel may be available for assignment to a different user station. In time division duplex (TDD) mode, each frame may actually consist of an uplink subframe and a downlink subframe but subchannel assignment within these subframes is similar for all intended purposes. Uplink assignments may be independent of the downlink assignment. Moreover, (i) different users may be served on the UL and DL at the same frame, different numbers of subchannel sets may be used for the UL subframe and the DL subframe, and/or different periodicity lengths may be used for the uplink and for the downlink, In this manner, data transfer between a base station and multiple subscriber stations may be accomplished at every TTI. In scalable OFDMA (sOFDMA), the number of subcarriers available for partitioning may be varied depending on the number users present and/or the number subchannels needed. The various embodiments however are not limited to any particular type or implementation of OFDMA or even use of OFDMA as the scheduling algorithms discussed herein may be implemented using any multiple access modulation scheme where suitably applicable.

Data sent within a radio frame may consist of a number of bursts where each burst is a continuous portion of data that may be sent over the allocated subchannels using a certain modulation scheme (e.g., binary phase shift keying (BPSK) or some level of quaternary phase shift keying (QPSK) or quaternary amplitude modulation (QAM). If desired, some form of Forward Error Correction (FEC) coding such as convolutional coding (CC), convolutional turbo coding (CTC) or low density parity check (LDPC) coding may be used. In the inventive embodiments, these are collectively referred to as a modulation and coding scheme (MCS).

In various inventive embodiments, a base station scheduler, which may be a portion of a medium access control (MAC) subconvergence layer, may be responsible for multi-user subchannel assignment, per-user power selection, determining optimal beamforming coefficients and/or selection of MCS.

Figure 2:
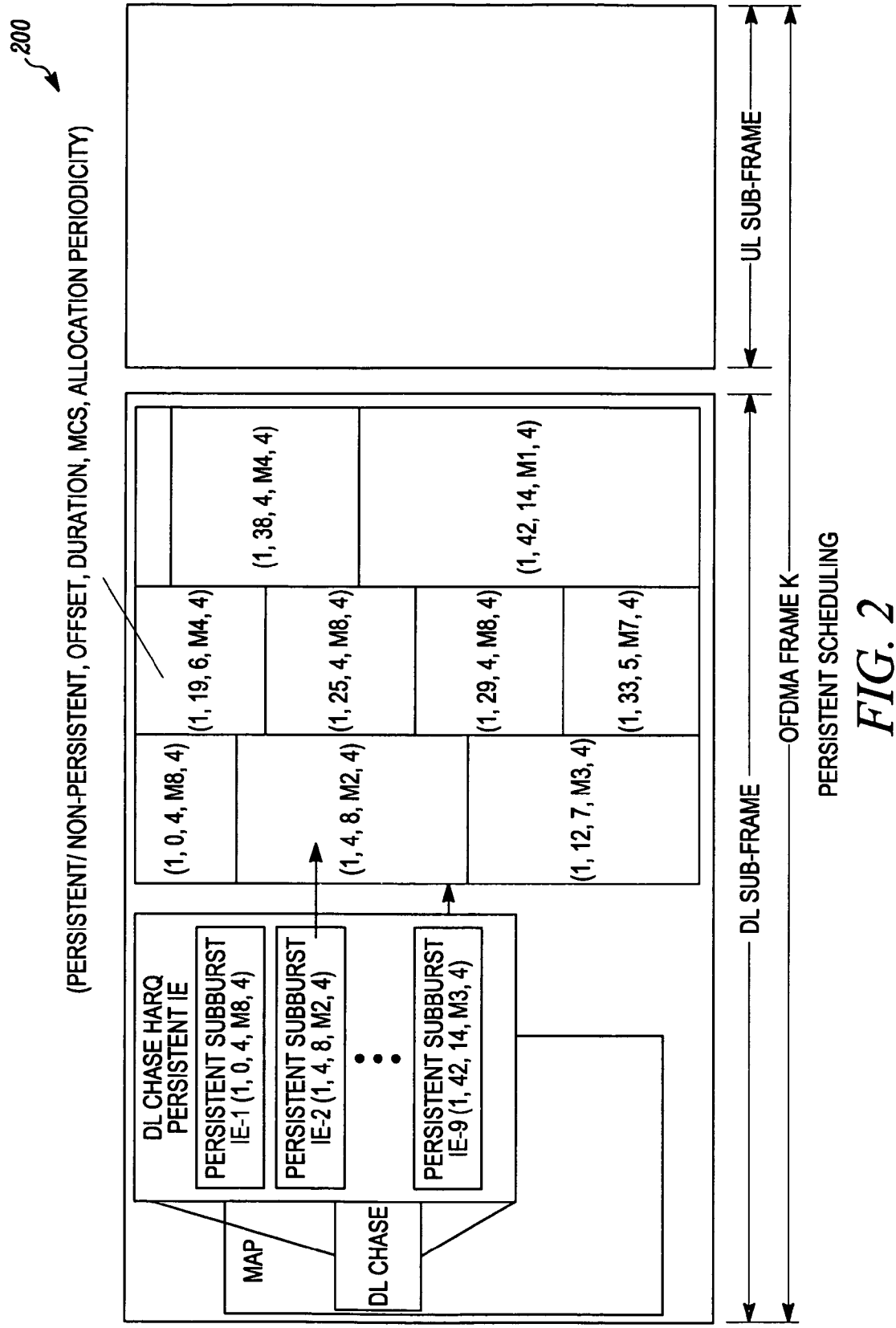
FIGS. 2-4 shown example allocation mapping for various scenarios of the inventive embodiments.

Persistent allocations in the downlink (DL) sub-frame and uplink (UL) sub-frame may be specified using DL-Persistent information elements (IEs) and UL-Persistent-IEs, respectively as shown in FIG. 2. Similarly non-persistent allocations, also known as dynamic allocations are specified using DL-IEs and UL-IEs. DL-Persistent-IEs, UL-Persistent-IEs, DL-IEs, and UL-IEs contain different fields. Of these, the following fields are relevant to certain embodiments of this invention:

Resource Shift Indicator:
If Resource Shifting Indicator is set to '1', the mobile station (MS) shall shift its persistent resource position by the accumulated slots as indicated by de-allocation commands with slot offset smaller than its own.

Persistence Flag:
The persistence flag shall be set to =0 if the assignment is persistent and shall be set to 1 if the assignment is non-persistent.

Allocation Flag:
The allocation flag shall be set=1 if the sub-burst IE is allocating time-frequency resources and shall be set to =0 if the sub-burst IE is de-allocating time-frequency resources.

Slot Offset The slot offset shall be set to the first slot in the time-frequency resource assignment with respect to the lowest numbered OFDM symbol and the lowest numbered subchannel in the hybrid automatic repeat request (HARQ) region.

Duration:
Duration specifies the size (# slots) of an allocation/de-allocation/reallocation in a HARQ region.

Sub-Burst DIUC/UIUC:
Specifies the DIUC/UIUC used for a sub-burst.
Repetition Coding Specifies the Repetition Coding used for a sub-burst.

Allocation Period (ap):
The allocation period (ap) shall be set to one less than the period of the persistent allocation, in units of frames. For example, as illustrated below, if ap=0b00011, then the period of the persistent allocation is four frames, and the time-frequency resource assignment is valid in frames N, N+4, N+8, etc.

Embodiments of the present invention describe optimization techniques to eliminate the repetitive information fields from the DL-Persistent-IEs, UL-Persistent-IEs, DL-IEs, and UL-IEs which in turn reduces MAP overhead.

In addition embodiments of the invention describe methods to use the same HARQ region to contain persistent as well as non-persistent allocations. The use of the same HARQ region for persistent as well as non-persistent allocations further reduces the MAP overhead as it requires only a single header to define the HARQ region instead of the two headers that are required to define two different HARQ regions. That is, one for persistent allocation and a second one for non-persistent allocations. Furthermore, it enables efficient usage of the allocation holes in the persistent scheduling region.

Further embodiments disclosed herein also define a retransmission message (IE) which further reduces the overhead associated with retransmissions of HARQ packets.

Map Optimization Techniques:
Slot Offset Optimization:
As described earlier, the slot offset shall be set to the first slot in the time-frequency resource assignment with respect to the lowest numbered OFDM symbol and the lowest numbered subchannel in the HARQ region. The slot offset of different HARQ sub-bursts in a HARQ region is illustrated in FIG. 2. It may be noted that the fields of DL Chase HARQ Persistent IE relevant to this IDF are shown in FIG. 2. The DL MAP contains DL Chase HARQ Persistent IE which contains the proposed Persistent Sub-burst IEs for different sub-bursts inside the DL HARQ region. The first sub-burst starts from the beginning of the HARQ region, so the slot offset for this sub-burst is 0. The first sub-burst has size of 4 slots, thus the second sub-burst has slot offset of 4. Thus, it can be observed that the:

slot offset of sub-burst ($j$)=slot offset of sub-burst ($j-1$)+duration of sub-burst ($j-1$)      Eq. (1); and duration of sub-burst ($j$)=slot offset of sub-burst ($j+1$)−slot offset of sub-burst ($j$)      Eq. (2)

Therefore, when two consecutive sub-bursts have same duration, the slot offset for the sub-burst that is next to these two sub-bursts need not be specified. For example, sub-burst (5) and sub-burst (6) have the same duration. In this case, using Eq. (2):

Duration of sub-burst (5)=29−25=4 slots; and
Duration of sub-burst (6)=33−29=4 slots.

As the durations of sub-burst (5) and sub-burst (6) are same, the slot offset of sub-burst (7) can be determined as follows:

Slot offset of sub-burst ($j+1$)=slot offset of sub-burst ($j-1$)+2*duration of sub-burst ($j-1$)      Eq (3).

Using Eq. (3) slot offset of sub-burst (7)=25+2*4=33.

It can be seen that it is not always necessary to specify the offset of the sub-burst when it can be deduced from information about the duration.

Certain embodiments of the invention propose the use of a one bit Slot Offset Indicator flag to specify whether or not slot offset is specified for a sub-burst. When Slot Offset Indicator=1 for a sub-burst, its slot offset is specified explicitly in the corresponding Persistent Sub-burst IE. On the other hand, when Slot Offset Indicator=0 for a sub-burst, its slot offset is not specified in the corresponding Persistent Sub-burst IE and the slot offset is determined using Eq. (3).

Duration Optimization:

The duration field of the Persistent Sub-burst IE specifies the duration of a sub-burst in the number of slots. When the sub-bursts are located next to one another without any allocation holes, the duration of a sub-burst, e.g., sub-burst j, can be determined as $$\text{Duration of sub-burst }(j)=\text{Slot offset of sub-burst }(j+1)-\text{Duration of sub-burst }(j) \quad \text{Eq. (4)}$$

Thus, when sub-bursts in a HARQ region are located next to each other, the explicit specification of their duration can be eliminated and the duration of the sub-bursts can be determined from the slot offset of the sub-bursts.

Figure 3:
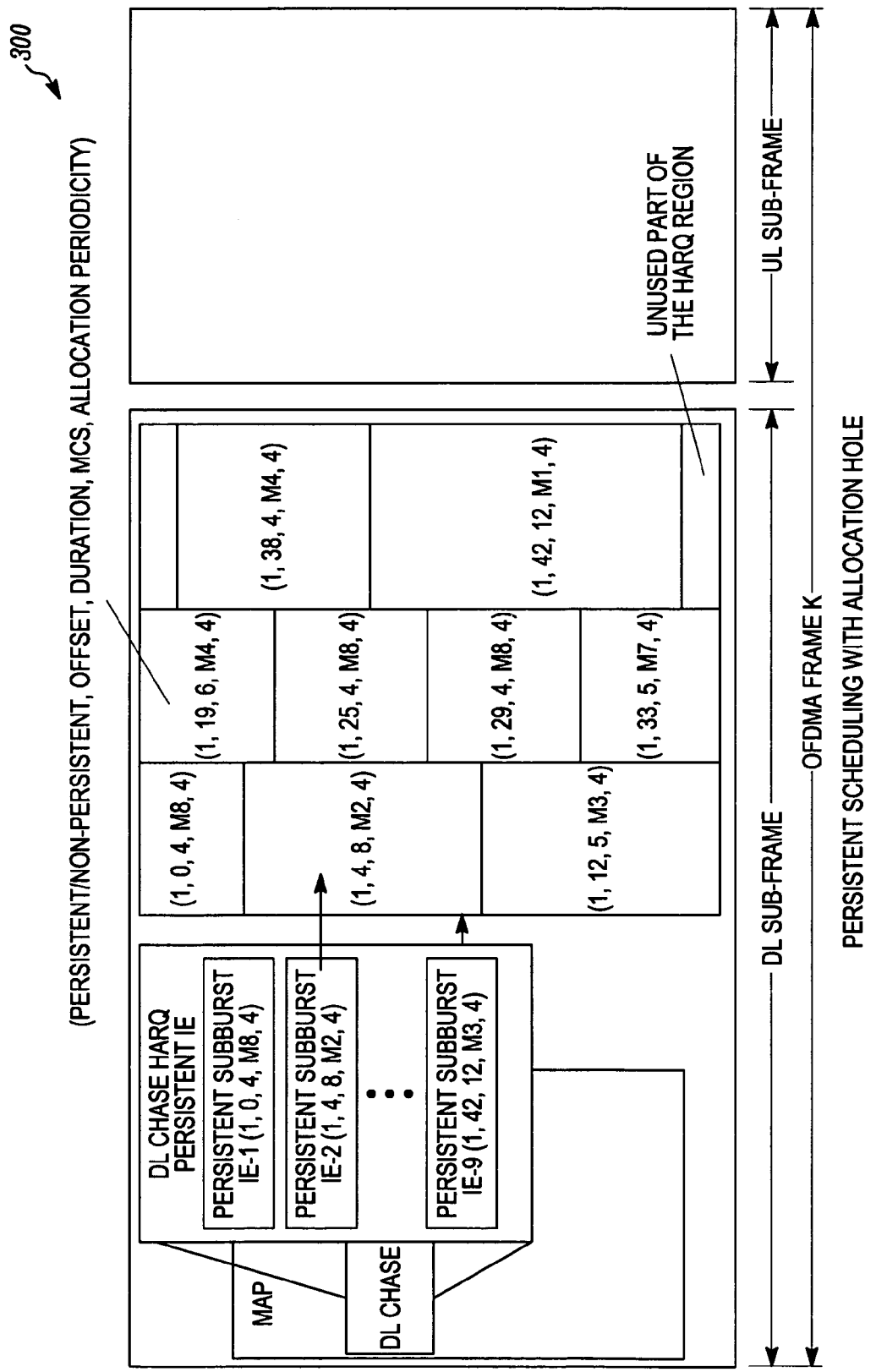

However, when there is allocation hole in a HARQ region, the duration of the sub-burst just before the allocation hole shall be specified explicitly. This scenario is illustrated in FIG. 3 with allocation hole after the last sub-burst in the HARQ region. In this case the duration of the last sub-burst needs to be specified explicitly.

Additional defined is the use of a one bit Duration Indicator flag to specify whether or not duration is specified for a sub-burst. When Duration Indicator=1 for a sub-burst, its duration is specified explicitly in the corresponding Persistent Sub-burst IE. On the other hand, when Duration Indicator=0 for a sub-burst, its duration is not specified in the corresponding Persistent Sub-burst IE and the duration is determined using Eq. (4).

Allocation Periodicity Optimization:

As described earlier the allocation period (ap) shall be set to one less than the period of the persistent allocation, in units of frames. For example, as illustrated below, if ap=0b00011, then the period of the persistent allocation is four frames, and the time-frequency resource assignment is valid in frames N, N+4, N+8, etc. When the allocation periodicity of two or more consecutive sub-bursts is same, it is not necessary to specify this information for all the sub-bursts.

A one bit Allocation Periodicity Indicator flag may be used to specify whether or not allocation periodicity is specified for a sub-burst. When Allocation Periodicity Indicator=1 for a sub-burst, its allocation periodicity is specified explicitly in the corresponding Persistent Sub-burst IE. On the other hand, when Allocation Periodicity Indicator=0 for a sub-burst, its allocation periodicity is not specified in the corresponding Persistent Sub-burst IE and the allocation periodicity is same as the previous sub-burst.

MCS Optimization:

When the MCS (DIUC/UIUC and Repetition Coding) of two or more consecutive sub-bursts in a HARQ region is the same, it is not necessary to specify this information for all these sub-bursts.

A one bit MCS Indicator flag may be used to specify whether or not DIUC/UIUC and Repetition Coding are specified for a sub-burst. When MCS Indicator=1 for a sub-burst, its DIUC/UIUC and Repetition Coding are specified explicitly in the corresponding Persistent Sub-burst IE. On the other hand, when MCS Indicator=0 for a sub-burst, its DIUC/UIUC and Repetition Coding are not specified in the corresponding Persistent Sub-burst IE and the DIUC/UIUC and Repetition Coding are same as the previous sub-burst.

Figure 4:
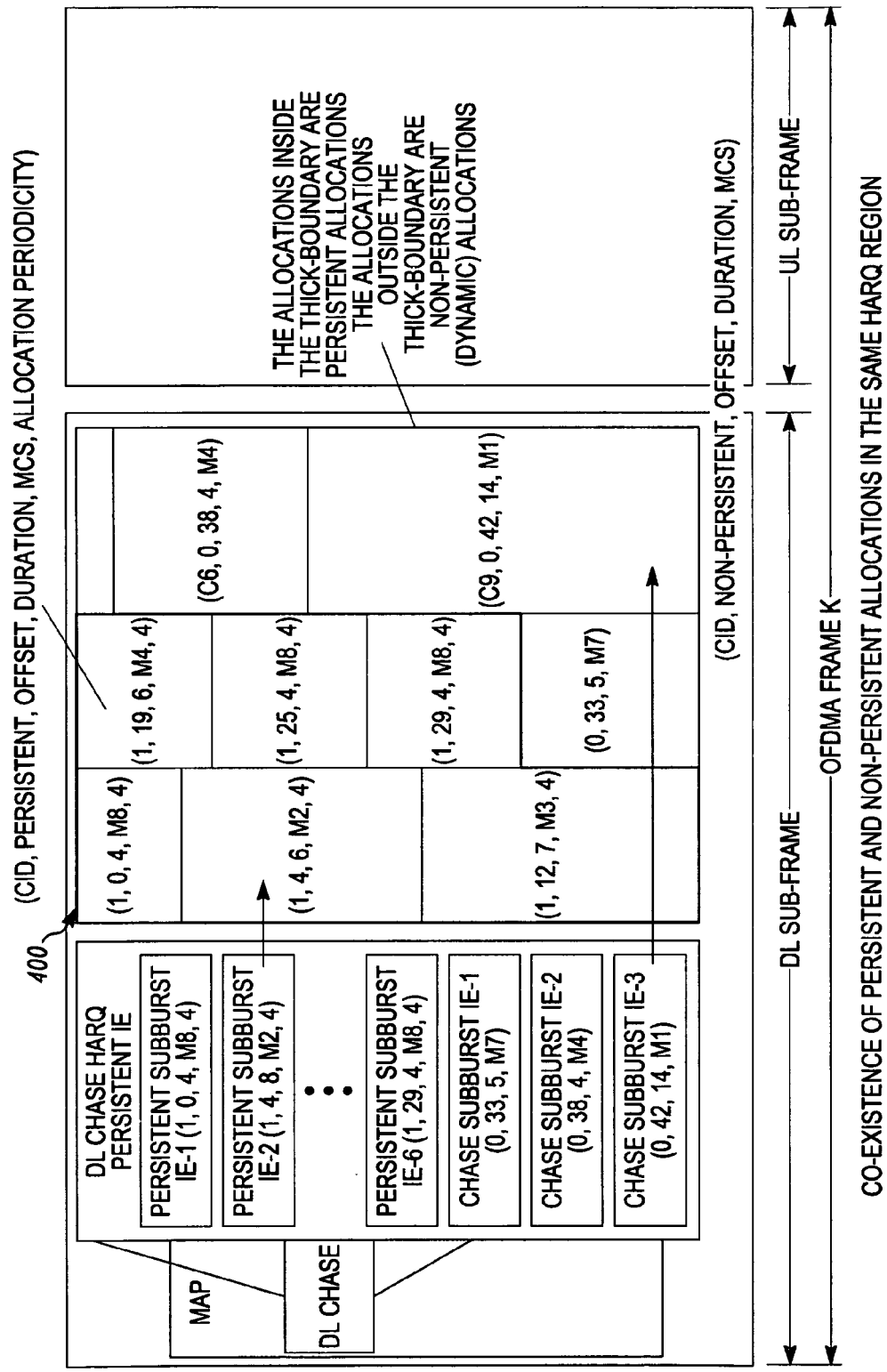

Co-Existence of Persistent and Non-Persistent Allocations in the Same HARQ Region:

When both persistent and non-persistent allocations, also known as dynamic allocations, are present in a particular DL/UL sub-frame, these allocations can co-exist in one HARQ region 400 as shown in FIG. 4. As shown in the figure, the persistent allocations are located at the beginning of the HARQ region followed by non-persistent allocations. It may be noted that if there are allocation hole(s) in the persistent allocation part of the HARQ region, then the allocation hole(s) can be occupied by one or more non-persistent allocations.

According to various embodiments, the following flags may be added to the Persistent and Non-persistent sub-burst IEs:

Slot Offset Indicator:

Slot Offset Indicator flag determines whether or not Offset is specified for a sub-burst. If this flag is =1, it indicates that Offset explicitly assigned for a sub-burst. Otherwise, the offset of the sub-burst can be determined from the offset of the earlier bursts. This flag shall be '1' for the first and second sub-bursts in a HARQ region.

Duration Indicator:

Duration Indicator flag determines whether or not Duration is specified for a sub-burst. If this flag is '1,' it indicates that Duration is explicitly assigned for a sub-burst. Otherwise, the sub-burst has the same Duration as the previous sub-burst. This flag shall be '1' for the first sub-burst in a HARQ region.

MCS Indicator:

MCS Indicator flag determines whether or not DIUC/UIUC and Repetition Coding are specified for a sub-burst. If this flag is '1,' it indicates that DIUC/UIUC and Repetition Coding are explicitly assigned for a sub-burst. Otherwise, the sub-burst has the same DIUC/UIUC and Repetition Coding as the previous sub-burst. This flag shall be '1' for the first sub-burst in a HARQ region.

Allocation Periodicity Indicator:

Allocation Periodicity Indicator flag determines whether or not the allocation periodicity is specified for a sub-burst. If this flag is '1,' it indicates that Allocation Periodicity is explicitly assigned for a sub-burst. Otherwise, the sub-burst will use the same Allocation Periodicity as the previous sub-burst. This flag shall be '1' for the first sub-burst in a HARQ region.

FIG. 5 shows the format of persistent and non-persistent sub-burst IEs for different scenarios.

Efficient HARQ Retransmission Techniques for Persistently Allocated Users:

In a typical scenario with 10-20% target PER for the initial transmission, it is reasonable to expect that 20-30% of the packets need HARQ retransmissions. In this invention, we propose mechanisms to reduce the overhead in the MAP signaling involved in specifying the retransmission information for the MS's who need retransmissions.

When data is transmitted from BS in Frame K the MS will send HARQ ACK or NAK in Frame K+Y where Y>=0 is specified by the standard or may vary by implementation. The MS will use the pre-assigned HARQ ACK channel to notify the BS on any HARQ data reception failure. In response, the BS can make an HARQ retransmission in subsequent frames.

Several parameters such as Duration, MCS or DIUC/UIUC with Repetition, ACID and CID/RCID that need to be signaled in the MAP for the retransmission could be same as the initial HARQ transmission. The premise is to avoid specifying these parameters again in the retransmission to reduce the MAP overhead.

Figure 6:
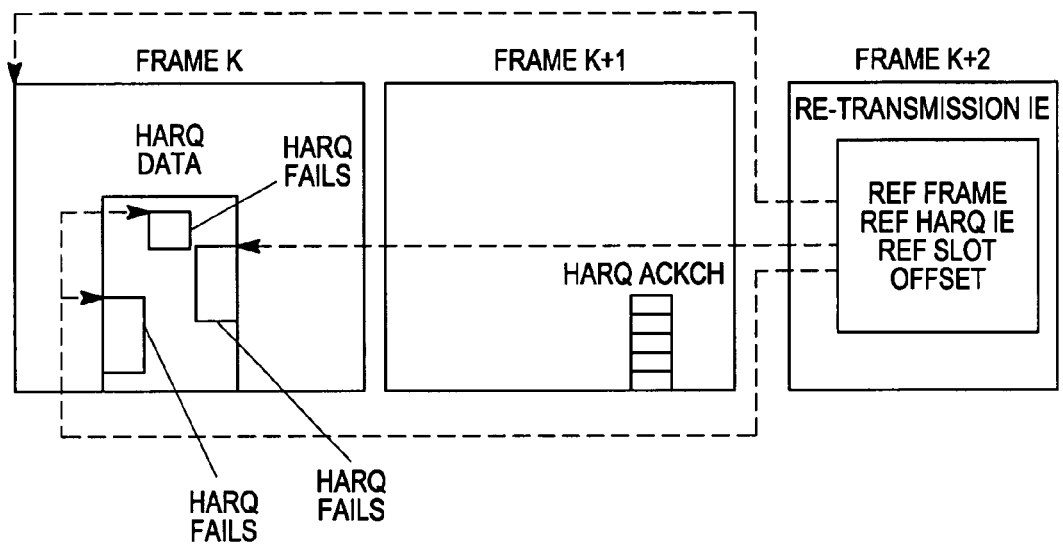
FIG. 6 is a functional block diagram detailing an example hybrid automatic repeat request (HARQ) according to various embodiments.

An example of an HARQ retransmission scenario and how the retransmission MAP signaling can be reduced is shown in FIG. 6. In this example Y=1 and the HARQ retransmission is made 2 frames after the initial HARQ transmissions. Basically, the Retransmission IE needs to refer the original frame or reference frame, and the specific HARQ IE that specified all the HARQ allocations and the specific packet transmissions. Frame reference can specify by a frame offset. The HARQ IE with in the frame can be identified by the Region ID or some IE numbering. The specific data packets can be uniquely identified by the Slot Offset. It is also possible to use CID or RCID to identify the packet but if there are more than one transmission for the same CID in a frame there will be ambiguity.

Format of the Retransmission IE:

```
Retransmission IE {
While (Retransmissions from Frame i to be scheduled in Frame K+2){
Frame i Offset   [4 bits]        (i.e., reference Frame i)
    HARQ IE    [8 bits]        (i.e., referring to the original HARQ Region, could use
    Region ID)
    For (j=0;j<Num_retrans;j++){
        Delta Ref Slot Offset Indicator    [1 bit] (next level optimization in referring
    several HARQ Fails)
        If (Delta Ref Slot Offset Indicator==1)
            Delta Ref Slot Offset    [5 bits]      (Ref Slot Offset = Ref Slot
    Offset + Delta Ref Slot Offset)
        Else
            Ref Slot Offset [10 bits]
If (Slot_Offset_Indicator==1){   (if not implicit for the location of the retransmission in
    Frame K+2)
            Slot_Offset   [10 bits]
        If (Last_allocation==1)
            Get the Duration information from reference frame (horizontal reference)
        Elseif (First_allocation==1)
            Specify Duration
        Else            (neither Last allocation nor First allocation)
            Get the duration information from the previous allocation (vertical
    reference)
        Ref_MCS Change Indicator [1 bit]
        If (Ref_MCS Change Indicator==1)
            MCS/Rep   [6 bits]        (horizontal reference)
        }
}
}
}
```

It must be observed that this solution is not limited to persistent allocations and it can be applied to any HARQ retransmission that requires repetition of resource allocation information with every retransmission.

The Retransmission IE may be part of the HARQ IE and can be used regardless of whether the original transmission is persistent or non-persistent. The Retransmission IE of various embodiments can be used for both persistent scheduling and dynamic scheduling and the benefits of using the inventive Retransmission IE increases when non-adaptive synchronized HARQ is used.

The optimization methods of the various embodiments eliminate the specification of repeated information in sub-burst IEs. Thus, it reduces MAP overhead. The MAP overhead reduction of a particular sub-burst IE depends on the number of optimizations used for the corresponding sub-bursts. For example, when all the proposed optimizations are used for a sub-burst IE, its size is minimized. On the other hand, when none of the proposed optimization methods are used, the size of the sub-burst IE is maximized. The size of persistent and non-persistent sub-burst IEs for different optimization scenarios are shown in FIGS. 7 and 8, respectively. It can be observed that using the proposed optimization methods up to 50% reduction in the size of persistent sub-burst IE can be achieved. Similarly, up to 60% reduction in the sub-burst IE size can be achieved for non-persistent sub-burst IEs using the proposed optimization methods.

Figure 9:
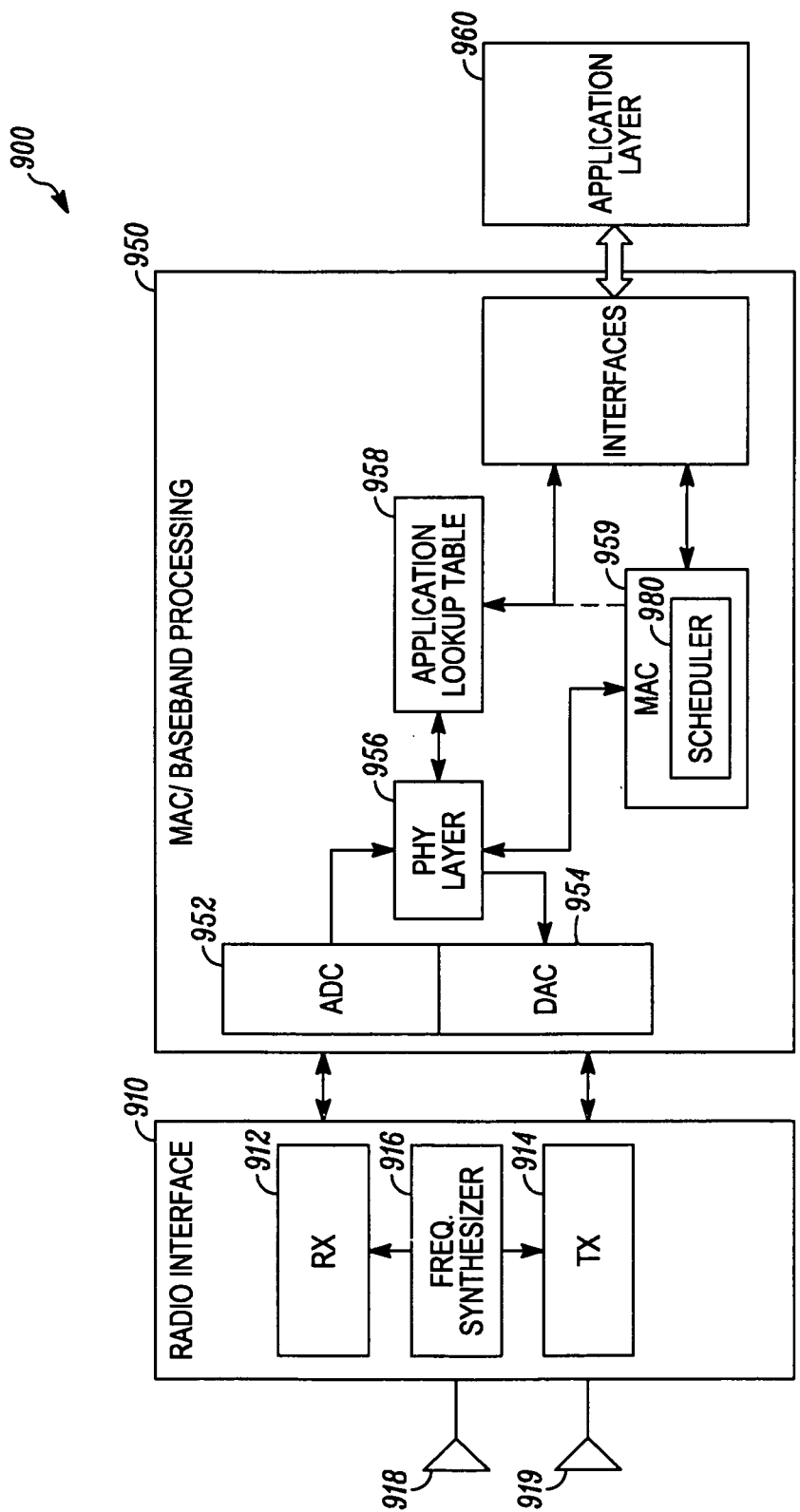
FIG. 9 shows an example apparatus for wireless transmission and reception using the allocation and scheduling of the inventive embodiments.

As shown in FIG. 9, an apparatus 900 for use in a wireless network may include a processing circuit 950 including logic (e.g., circuitry, processor and software, or combination thereof) to schedule traffic for multiple subscribers as described in one or more of the processes above. In certain non-limiting embodiments, apparatus 900 may generally include a radio frequency (RF) interface 910 and a medium access controller (MAC)/baseband processor portion 950.

In one example embodiment, RF interface 910 may be any component or combination of components adapted to send and receive multi-carrier modulated signals (e.g., OFDMA) although the inventive embodiments are not limited to any specific over-the-air (OTA) interface or modulation scheme. RF interface 910 may include, for example, a receiver 912, a transmitter 914 and a frequency synthesizer 916. Interface 910 may also include bias controls, a crystal oscillator and/or one or more antennas 918, 919 if desired. Furthermore, RF interface 910 may alternatively or additionally use external voltage-controlled oscillators (VCOs), surface acoustic wave filters, intermediate frequency (IF) filters and/or radio frequency (RF) filters as desired. Various RF interface designs and their operation are known in the art and an expansive description thereof is therefore omitted.

Processing portion 950 may communicate with RF interface 910 to process receive/transmit signals and may include, by way of example only, an analog-to-digital converter 952 for down converting received signals, a digital-to-analog converter 954 for up converting signals for transmission, and if desired, a baseband processor 956 for physical (PHY) link layer processing of respective receive/transmit signals. Processing portion 950 may also include or be comprised of a processing circuit 959 for medium access control (MAC)/data link layer processing.

In certain embodiments of the present invention, MAC processing circuit 959 may include a scheduler 980, in combination with additional circuitry such as a buffer memory (not shown) and baseband circuit 956, may function to generate the UL/DL IEs for scheduling or other processes as in the embodiments previously described. Alternatively or in addition, baseband processing circuit 956 may perform these processes independent of MAC processing circuit 959. MAC and PHY processing may also be integrated into a single circuit if desired.

Apparatus 900 may be, for example, a base station, an access point, a hybrid coordinator, a wireless router or NIC and/or network adaptor for computing devices. Accordingly, the previously described functions and/or specific configurations of apparatus 900 could be included or omitted as suitably desired. In some embodiments apparatus 900 may be configured to be compatible with protocols and frequencies associated one or more of the IEEE 802.16 standards for broadband wireless networks, although the embodiments are not limited in this respect.

Embodiments of apparatus 900 may be implemented using single input single output (SISO) architectures. However, as shown in FIG. 9, certain preferred implementations may include multiple antennas (e.g., 918, 919) for transmission and/or reception using spatial division multiple access (SDMA) and/or multiple input multiple output (MIMO) communication techniques. Further, embodiments of the invention may utilize multi-carrier code division multiplexing (MC-CDMA) multi-carrier direct sequence code division multiplexing (MC-DS-CDMA) for OTA link access or any other existing or future arising modulation or multiplexing scheme compatible with the features of the inventive embodiments.

The components and features of station 900 may be implemented using any combination of discrete circuitry, application specific integrated circuits (ASICs), logic gates and/or single chip architectures. Further, the features of apparatus 900 may be implemented using microcontrollers, programmable logic arrays and/or microprocessors or any combination of the foregoing where suitably appropriate. It is noted that hardware, firmware and/or software elements may be collectively or individually referred to as "logic" or "circuit".

It should be appreciated that the example apparatus 900 shown in the block diagram of FIG. 9 represents only one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments of the present invention.

Unless contrary to physical possibility, the inventors envision the methods described herein: (i) may be performed in any sequence and/or in any combination; and (ii) the components of respective embodiments may be combined in any manner.

Although there have been described example embodiments of this novel invention, many variations and modifications are possible without departing from the scope of the invention. Accordingly the inventive embodiments are not limited by the specific disclosure above, but rather should be limited only by the scope of the appended claims and their legal equivalents.

The invention claimed is:

1. A method of communicating in a wireless network, the method comprising:
   receiving an orthogonal frequency division multiple access (OFDMA) frame over a wireless communication channel, the frame comprising a downlink (DL) or uplink (UL) subframe having a plurality of sub-bursts and a plurality of information elements (IEs) associated with each sub-burst,
   evaluating one or more one-bit indicator flags present in the IEs associated with a selected one of the sub-bursts; and
   when a one-bit indicator flag is set to zero, processing the selected sub-burst using a same value from a previous sub-burst; or
   when a one-bit indicator flag is set to one, processing the selected sub-burst using a specified value in one or more additional IEs associated with the sub-burst;
   wherein the one or more one-bit indicator flags comprise at least one of, a slot offset indicator flag, a duration field indicator flag, a modulation and coding scheme (MCS) indicator flag or an allocation periodicity indictor flag.

2. The method of claim 1 wherein both persistent allocation sub-bursts and dynamic allocation sub-bursts are present in the DL or UL subframe within a single hybrid automatic repeat request (HARQ) region.

3. The method of claim 1 wherein the received frame comprises a hybrid automatic repeat request (HARQ) retransmission and wherein the previous sub-burst is an initial HARQ transmission.

4. The method of claim 1 wherein the one or more additional IEs associated with each sub-burst include, a resource shift indicator field, a persistence flag field, an allocation flag field, a slot offset field, a duration field, a downlink or uplink interval usage code (DUIC/UUIC) field, a repetition coding field and an allocation period (ap) field.

5. A device for communicating in a wireless network, the device comprising:
   a receiver to receive an orthogonal frequency division multiple access (OH)MA) frame over a wireless communication channel, the frame comprising a downlink (DL) or uplink (UL) subframe having a plurality of sub-bursts and a plurality of information elements (IFs) associated with each sub-burst; and
   a processing circuit including logic to evaluate one or more one-bit indicator flags present in the IEs associated with a selected one of the sub-bursts in the received frame; and
   when a one-bit indicator flag is set to zero, to process the selected sub-burst using a same value from a previous sub-burst; or when any one-bit indicator flag is set to one, to process the selected sub-burst using a specified value in one or more additional IEs associated with the sub-burst;
   wherein the one or more one-bit indicator flags comprise at least one of; a slot offset indicator flag, a duration field indicator flag, a modulation and coding scheme (MCS) indicator flag or an allocation periodicity indictor flag.

6. The device of claim 5 wherein the received frame comprises a hybrid automatic repeat request (HARQ) retransmission and wherein the previous sub-burst is from an initial HARQ transmission.

* * * * *

UNITED STATES PATENT AND TRADEMARK OFFICE
CERTIFICATE OF CORRECTION

PATENT NO. : 8,570,958 B2
APPLICATION NO. : 12/419250
DATED : October 29, 2013
INVENTOR(S) : Mohanty et al.

It is certified that error appears in the above-identified patent and that said Letters Patent is hereby corrected as shown below:

In the Claims

In column 10, line 21, in Claim 1, delete "indictor" and insert --indicator--, therefor In column 10, line 34, in Claim 4, delete "(DUIC/UUIC)" and insert --(DIUC/UIUC)--, therefor In column 10, line 39, in Claim 5, delete "(OH)MA)" and insert --(OFDMA)--, therefor In column 10, line 42, in Claim 5, delete "(IFs)" and insert --(IEs)--, therefor In column 10, line 57, in Claim 5, delete "indictor" and insert --indicator--, therefor Signed and Sealed this
Second Day of December, 2014

Michelle K. Lee
*Deputy Director of the United States Patent and Trademark Office*